(12) United States Patent
Tan et al.

(10) Patent No.: US 9,725,040 B2
(45) Date of Patent: Aug. 8, 2017

(54) VEHICLE OBJECT DETECTION SYSTEM

(71) Applicant: Nissan North America, Inc., Franklin, TN (US)

(72) Inventors: Adrian Tan, Northville, MI (US); William M Tierney, Jr., Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 228 days.

(21) Appl. No.: 14/525,374

(22) Filed: Oct. 28, 2014

(65) Prior Publication Data

US 2016/0119587 A1  Apr. 28, 2016

(51) Int. Cl.
H04N 7/18 (2006.01)
B60R 1/00 (2006.01)

(52) U.S. Cl.
CPC ............... *B60R 1/00* (2013.01); *H04N 7/181* (2013.01); *B60R 2300/607* (2013.01)

(58) Field of Classification Search
CPC ............ B60R 2300/10; B60R 2300/20; B60R 2300/304; B60R 2300/607; B60R 11/04; B60R 2011/004; G06K 9/00; G06K 9/00805
USPC .......................................... 348/118, 148, 142
See application file for complete search history.

(56) References Cited

U.S. PATENT DOCUMENTS

| | | | |
|---|---|---|---|
| 5,949,331 A | 9/1999 | Schofield et al. | |
| 6,483,429 B1 | 11/2002 | Yasui et al. | |
| 6,593,960 B1 * | 7/2003 | Sugimoto | B60R 11/04 |
| | | | 348/142 |
| 7,592,928 B2 | 9/2009 | Chinomi et al. | |
| 7,969,326 B2 | 6/2011 | Sakakibara | |
| 7,984,574 B2 | 7/2011 | Pfohl et al. | |
| 8,077,203 B2 | 12/2011 | Abe | |
| 8,154,426 B2 | 4/2012 | Endo et al. | |
| 8,155,385 B2 | 4/2012 | Mizuta | |

(Continued)

FOREIGN PATENT DOCUMENTS

| | | |
|---|---|---|
| DE | 19741896 A1 | 4/1999 |
| FR | 2979299 A1 | 3/2013 |

(Continued)

*Primary Examiner* — Sath V Perungavoor
*Assistant Examiner* — Peet Dhillon
(74) *Attorney, Agent, or Firm* — Global IP Counselors, LLP

(57) ABSTRACT

A vehicle object detection system includes a vehicle body structure, a sensing device, a video display and a controller. The vehicle body structure defines a passenger compartment and has an underside section a predetermined height above ground. The sensing device detects height of an object within a prescribed area adjacent to the underside section as the vehicle body structure approaches the object. The video display is viewable from within the passenger compartment and displays images representing the prescribed area adjacent to the underside section of the vehicle body structure. The controller is configured to process object information received from the sensing device in order to determine the height of the object, and display images on the video display representing the object along with a representation of the height of the object relative to the underside section and images representing the underside section of the vehicle.

14 Claims, 9 Drawing Sheets

(56) References Cited

U.S. PATENT DOCUMENTS

| | | |
|---|---|---|
| 8,218,008 B2 | 7/2012 | Wu et al. |
| 8,243,994 B2 | 8/2012 | Suzuki et al. |
| 8,310,376 B2 | 11/2012 | Frank et al. |
| 8,332,097 B2 | 12/2012 | Chiba et al. |
| 2005/0231341 A1* | 10/2005 | Shimizu ................. B60Q 9/005 340/436 |
| 2008/0100472 A1* | 5/2008 | Mizusawa ................ B60R 1/00 340/932.2 |
| 2008/0205706 A1 | 8/2008 | Hongo |
| 2009/0121899 A1 | 5/2009 | Kakinami et al. |
| 2009/0122140 A1 | 5/2009 | Imamura |
| 2010/0034422 A1* | 2/2010 | James ................... G06T 7/246 382/103 |
| 2010/0230197 A1* | 9/2010 | Ortmann ............. B60L 11/1818 180/168 |
| 2010/0238051 A1 | 9/2010 | Suzuki et al. |
| 2010/0329510 A1 | 12/2010 | Schmid |
| 2012/0069182 A1 | 3/2012 | Sumi et al. |
| 2012/0288142 A1* | 11/2012 | Gossweiler, III .. G06K 9/00261 382/103 |
| 2012/0326917 A1 | 12/2012 | Kiehne |
| 2013/0093583 A1* | 4/2013 | Shapiro ................. G01S 15/931 340/436 |
| 2013/0107052 A1 | 5/2013 | Gloger et al. |
| 2013/0162639 A1* | 6/2013 | Muench ................ G06T 19/006 345/419 |
| 2013/0223673 A1* | 8/2013 | Davis ..................... G06K 9/78 382/100 |
| 2013/0314503 A1* | 11/2013 | Nix ................... G06K 9/00805 348/46 |
| 2014/0168415 A1* | 6/2014 | Ihlenburg ............... B60R 11/04 348/118 |
| 2014/0266654 A1* | 9/2014 | Parker ................... B60R 25/00 340/426.25 |
| 2014/0313187 A1* | 10/2014 | Cohen ................ H04N 13/0011 345/419 |

FOREIGN PATENT DOCUMENTS

| | | |
|---|---|---|
| JP | 2007-255976 A | 10/2007 |
| JP | 4724522 B2 | 7/2011 |
| JP | 4765213 B2 | 9/2011 |
| JP | 5386850 B2 | 1/2014 |
| WO | 2012-172580 A1 | 12/2012 |
| WO | 2014-054239 A1 | 4/2014 |

* cited by examiner

VEHICLE OBJECT DETECTION SYSTEM

BACKGROUND

Field of the Invention

The present invention generally relates to a vehicle object detection system. More specifically, the present invention relates to an object detection system that detects the heights of objects as the vehicle approaches the objects.

Background Information

Many vehicles are provided with video cameras that are aimed at areas adjacent to respective sides of the vehicle and are employed during maneuvers such as, for example, parking and/or backing up. Such cameras are angled downward such that they do not provide a vehicle operator with an accurate sense of the actual height of objects within the camera's field of view, but rather provide visual object contact confirmation. Some objects that are visible to the camera can appear to have a very small vertical dimension (i.e., low height). Consequently, vehicles with a low clearance where, for example, a lower surface of a spoiler or lower surface of a bumper fascia is fairly close to the ground, sometimes get scratched by objects that appear small to the camera but are high enough to contact underside sections and underside surfaces of the vehicle.

SUMMARY

One object of the disclosure is to provide a vehicle with an object detection system that determines height of an object as the vehicle approaches the object.

Another object of the disclosure is to provide with an object detection system of a vehicle with a display showing height of an identified object relative to an underside of the vehicle as the vehicle approaches the object.

In view of the state of the known technology, one aspect of the disclosure includes a vehicle object detection system having a vehicle body structure, a sensing device, a video display and a controller. The vehicle body structure defines a passenger compartment and has an underside section located at a predetermined height above ground below the vehicle body structure. The sensing device is configured to detect an object within a prescribed area adjacent to the underside section of the vehicle body structure as the vehicle approaches the object. The video display is viewable from within the passenger compartment and is configured to display images representing the prescribed area adjacent to the underside section of the vehicle body structure. The controller is configured to process object information received from the sensing device to determine the height of the object, and display images on the video display representing the object along with a representation of the height of the object relative to the predetermined height of the underside section above the ground and images representing the underside section of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
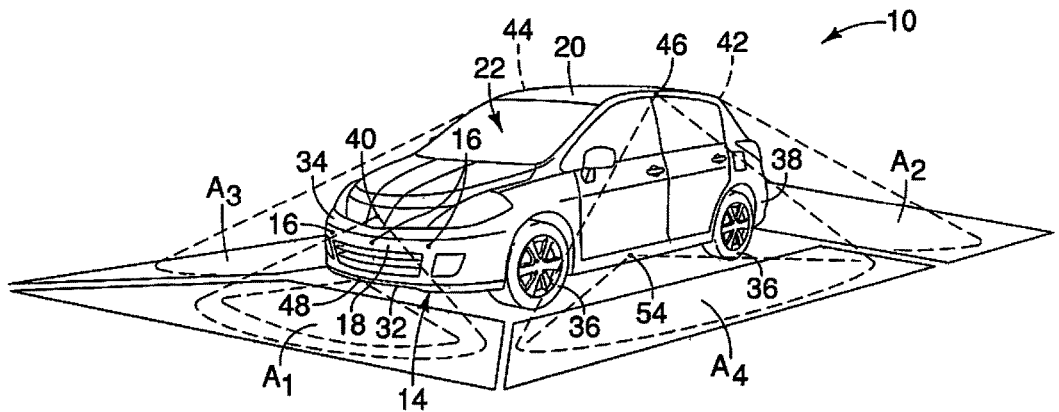
FIG. 1 is a perspective view of a vehicle having cameras, an object detection system and underside sections with low clearance to the ground below, the cameras being aimed at respective areas adjacent to side surfaces of the vehicle, with a field of view for each camera superimposed around the vehicle in accordance with a first embodiment.

Referring initially to FIG. 1, a vehicle 10 is illustrated in accordance with a first embodiment. The vehicle 10 includes an object detection system 12 (FIG. 2) that is configured to determine the height of an object as the vehicle 10 approaches the object. Further, the height is determined relative to a height of an underside section 14 of the vehicle 10 such that a vehicle operator (not shown) is provided with a warning and/or indication of the proximity of the object to the vehicle 10, specifically, the underside section 14, as the vehicle 10 continues to move toward the object, as is described in greater detail below. The vehicle 10 also includes conventional proximity sensors 16 and 16a (FIG. 8) that are part of a proximity detection system that detects proximity of objects as outermost surfaces 18 and 18a (FIG. 8) of the vehicle 10 approach those objects. The conventional proximity sensors 16 of the proximity detection system are shown in FIG. 1 at the front of the vehicle 10 (FIG. 1) and at the rear of the vehicle 10 (FIG. 8), as described in greater detail below.

Figure 3:
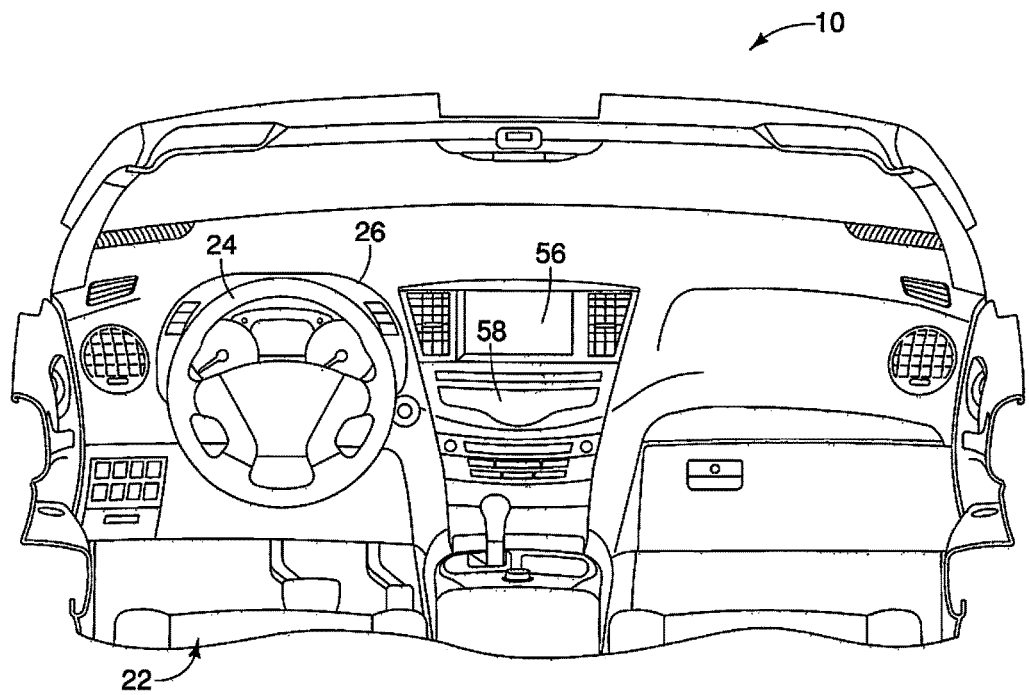
FIG. 3 is an elevational view of an instrument panel within a passenger compartment of the vehicle depicted in FIG. 1, showing the video display and the control panel of the object detection system in accordance with the first embodiment.

As shown in FIG. 1, the vehicle 10 includes a vehicle body structure 20 that defines a passenger compartment 22, the underside section 14 and outermost surfaces 18. As shown in FIG. 3, the passenger compartment 22 includes a steering column 24 and an instrument panel 26.

As is explained in greater detail below, the underside section 14 of the vehicle body structure 20 can be defined as any one, or combinations of the surfaces under the vehicle 10 that face downward, faces the ground G, or are close to the ground G under the vehicle 10 or adjacent to the underside section 14 of the vehicle 10. For example, the underside section 14 can be a lower surface 32 of a front bumper fascia 34, a surface of one of the wheels 36, a lower surface of a rear bumper fascia 38, lower side surfaces of the fenders or doors, splash guards and/or underside surfaces of fenders adjacent to the wheels 36. For purposes of understanding the object detection system 12, the underside section 14 is any one or ones of the surfaces of the vehicle 10 or wheel 36 that can come into contact an object in the path of the vehicle 10 when the vehicle 10 is moving, such as during parking and/or backing up. For purposes of understanding the invention, the operation of the object detection system 12 is described in a first example with the underside section 14 being the lower surface 32 of the front bumper fascia 34. The outermost surfaces 18 and 18a of the vehicle 10 are generally the front most surface of the front bumper fascia 34 and the rearmost surface of the rear bumper fascia 38, respectively. The proximity sensors 16 are installed in the front bumper fascia 34 and the proximity sensors 16a are installed in the rear bumper fascia 38.

Figure 2:
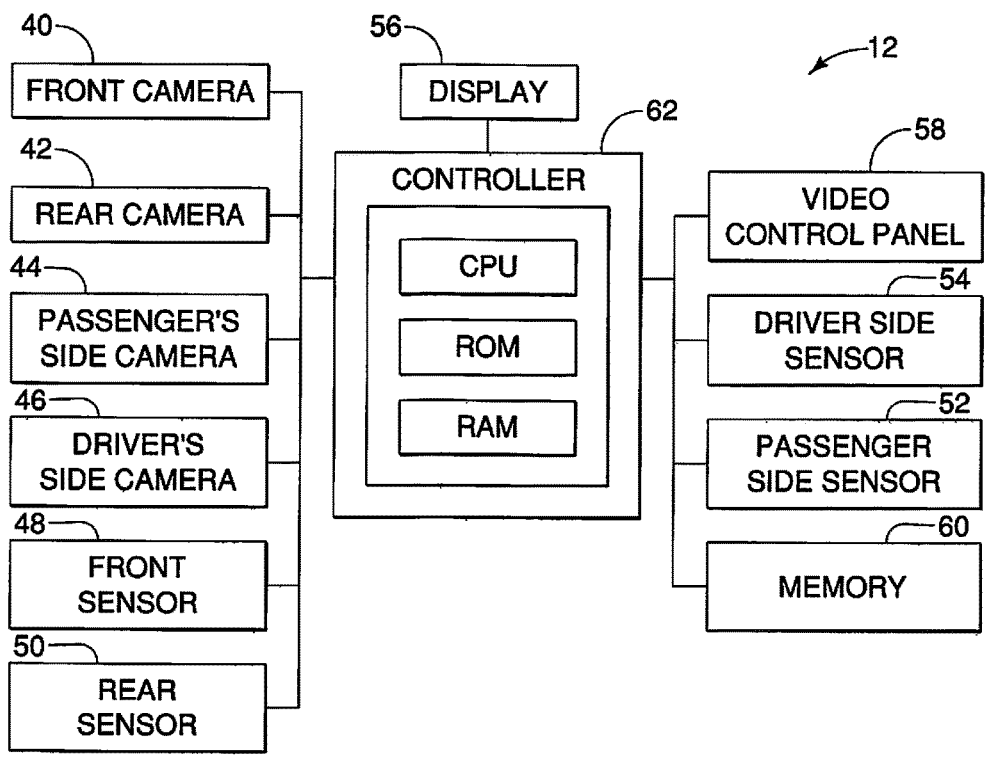
FIG. 2 is a block diagram of the object detection system of the vehicle depicted in FIG. 1, the object detection system including, among other elements, a plurality of the cameras, a plurality of sensors, a controller, a control panel and a video display in accordance with the first embodiment.

As shown in FIG. 2, the object detection system 12 basically includes the proximity sensors 16, a front camera 40, a rear camera 42, a passenger's side camera 44, a driver's side camera 46, a front sensor 48, a rear sensor 50, a passenger's side sensor 52, a driver's side sensor 54, a video display 56, a control panel 58, memory 60 and a controller 62. The various elements of the object detection system 12 are installed at predetermined locations on or within the vehicle body structure 20 of the vehicle 10. For example, as shown in FIG. 1, the front camera 40 is installed to a front surface of the vehicle body structure 20 above the front bumper fascia 34. Although not visible in FIG. 1, the rear camera 42 is installed to a rear surface of the vehicle body structure 20 above a rear bumper fascia 38 and the passenger's side camera 44 is installed to a side of the roof structure or alternatively to a bottom surface of a side view mirror of the vehicle body structure 20. The driver's side camera 46 is installed to a side of the roof structure or alternatively to a bottom surface of a side view mirror, of the vehicle body structure 20.

As shown in FIG. 1, the front sensor 48 is installed to the lower surface 32 of the front bumper fascia 34 and the driver's side sensor 54 is installed to a bottom surface of the vehicle body structure 20 beneath the driver's side door. The rear sensor 50 and passenger's side sensor 52 are installed to the rear and passenger's side of the vehicle body structure 20, respectively, in similar manners. The proximity sensors 16 and 16a are installed in the front bumper fascia 34 and the rear bumper fascia 38, respectively, and are for the purpose of detecting the proximity of objects that might contact the outermost surface 18 of the front bumper fascia 34 and another outermost surface 18a on the rear bumper fascia 38 as the vehicle 10 approaches a detected object.

As indicated in FIG. 1, the front camera 40 and the front sensor 48 are aimed at an area $A_1$ forward of the vehicle 10 adjacent to the front bumper fascia 34 in order to view and/or detect objects and the height of those objects within the area $A_1$ relative to the underside section 14 of the vehicle 10. The rear camera 42 and the rear sensor 50 are aimed at an area $A_2$ rearward of the vehicle 10 adjacent to the rear bumper fascia 38 in order to view and/or detect objects and further detect the height and distance of those objects within the area $A_2$ relative to the underside section 14 of the vehicle 10. The passenger's side camera 44 and the passenger's side sensor 52 are aimed at an area $A_3$ alongside the vehicle 10 in order to view and/or detect objects and detect the height and distance of those objects within the area $A_3$ relative to the underside section 14 of the vehicle 10. The driver's side camera 46 and the driver's side sensor 54 are aimed at an area $A_4$ alongside the vehicle 10 in order to view and/or detect objects and detect the height and distance of those objects within the area $A_4$ relative to the underside section 14 of the vehicle 10.

As shown in FIG. 3, the video display 56 and the control panel 58 are both installed as a part of the instrument panel 26.

The object detection system 12 is separate from the above mentioned proximity detection system. The proximity detection system utilizes object information detected by the proximity sensors 16 and 16*a*. Specifically, the proximity sensors 16 and 16*a* are conventional sensors that detect approaching objects that might contact the outermost surfaces 18 and 18*a*. In other words, the proximity sensors 16 are typically employed when parking the vehicle 10 in order to prevent an object from contacting the outermost surfaces 18 and 18*a* of the front bumper fascia 34 and the rear pumper fascia 28, respectively. Specifically, when the proximity sensors 16 or 16*a* detect an approaching object, the vehicle operator is provided with a warning of potential contact between the outermost surfaces 18 or 18*a* and the approaching object. The operation of the proximity detection systems are conventional and therefore are well known. Consequently, further description of such proximity detection systems is omitted for the sake of brevity.

The object detection system 12 of the vehicle 10 as described below is a height detection system for the purpose of preventing contact between a detected object that is lower than the height of the outermost surfaces 18 and 18*a*, and could be overlooked by the proximity detection system. Hence, the object detection system 12 compliments and can work simultaneously with the proximity detection system.

The object detection system 12 can be operated in a number of differing modes, as is described below. Typically, the object detection system 12 is enabled automatically when the vehicle 10 is in reverse (backing up) and/or parking. However, the vehicle operator can also utilize the control panel 58 to engage the object detection system 12 manually. The object detection system 12 can operate under a variety of circumstances, but is preferably engaged when the vehicle 10 is in reverse (backing up) or moving at a slow rate of speed, for example, under 10 mph. The object detection system 12 operates to perform several functions simultaneously. One function is to detect objects that have a low height and are located within any one of a plurality of predetermined areas adjacent to surfaces of the vehicle 10. Specifically, the object detection system 12 is configured to detect objects within any of the areas $A_1$, $A_2$, $A_3$ and/or $A_4$. Another function of the object detection system 12 is to determine the height and distance of any objects detected within any of the areas $A_1$, $A_2$, $A_3$ and/or $A_4$ relative to the underside section 14.

The object detection system 12 can be part of, or an add-on feature to an around view monitoring (AVM) system described in, for example, U.S. Patent Application Publication No. 2010/0238051, published Sep. 23, 2010 (application Ser. No. 12/680,423), U.S. Patent Application Publication No. 2012/0069182, published Mar. 22, 2012 (application Ser. No. 13/232,146), and U.S. Pat. No. 8,243,994, issued Aug. 14, 2012 (application Ser. No. 12/298,837) all commonly assigned to Nissan Motor Co. Ltd. The disclosures of U.S. Patent Application Publication No. 2010/0238051, U.S. Patent Application Publication No. 2012/0069182, and U.S. Pat. No. 8,243,994 are incorporated herein by reference in their entirety. Further, as mentioned above, the object detection system 12 can be added on or be part of the above described proximity detection system.

As mentioned above, the operation of the object detection system 12 is described below, with the underside section 14 being the lower surface 32 of the front bumper fascia 34. Specifically, the underside section 14 relative to the area $A_1$ is defined as the lower surface 32 of the front bumper fascia 34 since the lower surface 32 is the first surface of the vehicle 10 that an object might contact with the vehicle 10 moving forward toward the object. The underside section 14 as used herein is limited to those surfaces of the vehicle 10 that are below and inboard relative to the outermost surfaces 18 and 18*a*. Therefore, it should be understood from the drawings and the description herein that when the vehicle 10 is backing up, the underside section 14 relative to the area $A_2$ is a lower surface of the rear bumper fascia 38 since the lower surface of the rear bumper fascia 38 is a surface of the vehicle 10 that an object with a height lower than the outermost surface 18*a* might contact with the vehicle 10 moving rearward toward the object. As well, the underside section 14 relative to the areas $A_3$ and $A_4$ can be defined as a lower surface of the corresponding side of the vehicle 10 (for example, the vehicle doors or quarter panels) or the wheels 36 since the sides of the vehicle 10 and/or the wheels 36 are the first surface(s) of the vehicle 10 that an object with a height lower than the outermost surfaces 18 and 18*a* might contact with the vehicle 10 moving toward the object during, for example, a parallel parking maneuver. The object detection system 12 is configured to provide the vehicle operator with object contact avoidance information that the vehicle operator can use to prevent the underside section(s) 14 of the vehicle 10 from making contact with relatively short objects adjacent to the vehicle 10. The provided information can be a visual representation of the underside surface 34 with a visual representation of the detected object, and/or an audible signal. The visual representations can be video images and/or computer generated images, as described in greater detail below, and are in addition to warnings and/or visual information that is provided the proximity detection system connected to the proximity sensors 16 and 16*a*.

The lower surface 32 (and each of the possible underside sections 14) is located at a predetermined height above ground G beneath the vehicle body structure 20 and beneath or lower than the outermost surfaces 18 and 18*a*. The object detection system 12 is provided with information stored in memory and/or manually inputted with the predetermined height of the subject underside section 14. As the object detection system 12 detects the proximity of an object, the height of the object is detected and determined as well in order to provide such information to the vehicle operator about the height of the detected object relative to the height of the underside section 14, as described in greater detail below.

The front camera 40, the rear camera 42, the passenger's side camera 44 and the driver's side camera 46 (a plurality of cameras) are sensing devices configured to detect the presence of an object and the height of an object within a prescribed area adjacent to the underside section 14 of the vehicle body structure 20 as the vehicle body structure 20 approaches a detected object.

Further, the front sensor 48, the rear sensor 50, the passenger's side sensor 52 and the driver's side sensor 54 (a plurality of sensors) are also sensing devices configured to detect the presence of an object and the height of an object within a prescribed area adjacent to the underside section 14 of the vehicle body structure 20 as the vehicle body structure 20 approaches a detected object.

The vehicle 10 can also include a rear hatch or rear trunk lid (not shown). The rear hatch or rear trunk lid in many vehicles can be opened via use of a sensor beneath the vehicle that detects movement of a person's foot adjacent to the rear of the vehicle 10. The rear sensor 50 can be connected to the latch/opening mechanism of the rear hatch or rear trunk lid for the purpose of detecting movement and opening the rear hatch or trunk lid. Thus, the rear sensor 50 can have multiple purposes within the vehicle 10.

The plurality of cameras and/or the plurality of sensors provide data (object information) to the controller 62. The controller 62 is configured to process object information received from the plurality of cameras and the plurality of sensors (sensing devices) in order to determine the height of the object, and display images on the video display 56 representing the object along with a representation of the height of the object relative to the predetermined height of the underside section 14 and images representing the underside section 14 of the vehicle 10.

In the first embodiment described below, the plurality of cameras and the plurality of sensors can provide differing types of object information to the controller 62. Specifically, images are provided by the plurality of cameras and detection data is provided by the plurality of sensors. The controller 62 generates both computer generated images and video images to the video display 56. Specifically, the images shown in FIGS. 4-6, 11 and 13 and the right side of FIG. 7, are computer generated images or faux images that represent surfaces of the vehicle 10 along with surfaces that represent the detected object updated continuously by the controller 62 as the vehicle 10 moves relative to the object. The images shown in the left side of FIG. 7 and in FIGS. 8-10 and 12, on the other hand, are video images from the plurality of cameras along with a superimposed representation of the side surfaces of the vehicle 10.

However, it should be understood from the drawings and the description herein that the object detection system 12 can operate effectively with only the plurality of sensors serving as the sensing devices, as described with respect to a second embodiment described below. Similarly, it should be understood from the drawings and the description herein that the object detection system 12 can operate effectively with only the plurality of cameras serving as the sensing devices, as described with respect to a third embodiment described below.

In the first embodiment, the plurality of cameras are configured to provide images of the prescribed area(s) (the areas $A_1$, $A_2$, $A_3$ and/or $A_4$) adjacent to the corresponding underside section 14 of the vehicle body structure 20 with a representation of the vehicle 10 superimposed on the video display 56, as indicated in FIGS. 7-10 and 12, along with images of any objects within the prescribed area(s). Specifically, the front camera 40 captures images of the area $A_1$ adjacent to the front of the vehicle 10. The rear camera 42 captures images of the area $A_2$ adjacent to the rear of the vehicle 10. The passenger's side camera 44 captures images of the area $A_3$ adjacent to the passenger's side of the vehicle 10. The driver's side camera 46 captures images of the area $A_4$ adjacent to the driver's side of the vehicle 10. The images captured by the plurality of cameras in the first embodiment mainly provide visual object location information. Conventional cameras can only provide a vehicle operator with object location information relative to visible surfaces of the vehicle 10. More specifically, the images captured by the plurality of cameras can only provide the vehicle operator with an image of the object as the object approaches an outermost adjacent surface of the vehicle 10 as the vehicle approaches the object. These captured images do not necessarily provide the vehicle operator with information concerning the height of the object relative to unseen surfaces of the vehicle 10, such as the lower surface 32 of the front bumper fascia 34. However, the controller 62 can utilize the captured images from the plurality of cameras to determine the height of an approaching object. For example, the controller 62 can be further configured to calculate the height of surfaces of detected objects based upon images captured by the plurality of cameras, in combination with detection of vehicle speed. Using observed changes in geometric relationships between surfaces of detected objects, in combination with known distances traveled (based on speed), heights and distances can be determined by the controller 62. Still further, the controller 62 can use the captured images to create computer generated images of the detected object in order to better depict the detected object on the video display 56, even after the detected object is no longer within the viewing area corresponding to the view depicted in the AVM mode.

In the first embodiment, the plurality of sensors provide object detection information within the prescribed area(s) (the areas $A_1$, $A_2$, $A_3$ and/or $A_4$) adjacent to the corresponding underside section 14 of the vehicle body structure 20 and also provide object height information to the controller 62. Specifically, the front sensor 48 captures object information from the area $A_1$ adjacent to the front of the vehicle 10. The rear sensor 50 captures object information from the area $A_2$ adjacent to the rear of the vehicle 10. The passenger's side sensor 52 captures object information from the area $A_3$ adjacent to the passenger's side of the vehicle 10. The driver's side sensor 54 captures object information from the area $A_4$ adjacent to the driver's side of the vehicle 10. The captured object information by the plurality of sensors includes object height information and object distance information.

The plurality of cameras (the front camera 40, the rear camera 42, the passenger's side camera 44 and the driver's side camera 46) includes conventional video cameras that capture images and indications of relative movement of objects within each camera's field of vision and transmit those images to the controller 62. Since video cameras are conventional devices, further description is omitted for the sake of brevity.

The plurality of sensors (the front sensor 48, the rear sensor 50, the passenger's side sensor 52 and the driver's side sensor 54) can be any of a plurality of differing types of sensors often referred to as detection and ranging sensors or devices. Specifically, each of the plurality of sensors includes an emitting section (not shown) and a detecting section (not shown). The emitting section emits a prescribed signal and the detecting section detects returning signals that are reflected back from surfaces of nearby objects. For example, each of the plurality of sensors can be a sonar emitting and detecting device, a radar emitting and detecting device, an infrared emitting and detecting device and/or a laser light emitting and light detecting device (i.e. LIDAR). Further, the plurality of sensors can be rigidly fixed to the corresponding surfaces of the vehicle 10. Alternatively, the plurality of sensors can be attached to the vehicle 10 for pivotal movement about a pivot axis or articulating mount. The pivotal movement of each of the plurality of sensors can be controlled by the controller 62 or can be a part of the scanning capability of each of the sensors in the determination of height and distance to a detected object. Since detection and ranging sensors are conventional devices, further description is omitted for the sake of brevity.

The controller 62 is configured to display object information on the video display 56 in a plurality of differing formats. For example, the controller 62 and video display 56 can operate in at least a side view mode, an around view monitor mode (AVM mode) and a parallel parking view mode. In the description below for operation in the side view mode and the AVM mode, the front bumper fascia 34 (and/or an attached front or chin spoiler) is considered as the vehicle 10 moves the front bumper fascia 34 toward an object $B_1$. This description is equally applicable to the vehicle 10 as the rear bumper fascia 38 is moved toward another object (not shown). In other words, the object detection system 12 operates exactly the same with reference to objects to the front of the vehicle 10 and with reference to objects to the rear of the vehicle 10.

Figure 4:
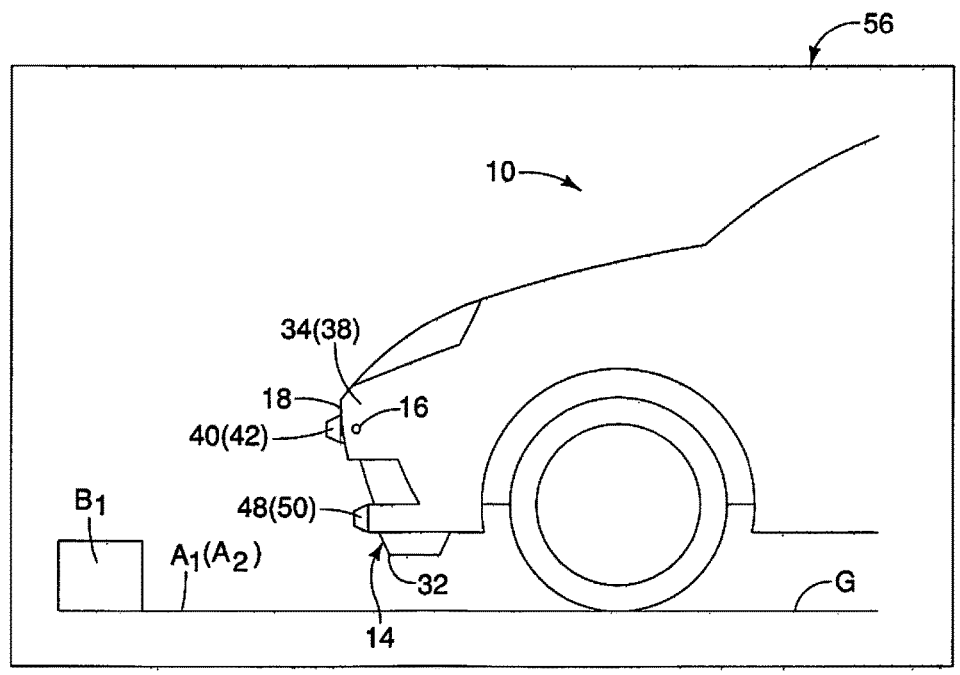
FIG. 4 is a representation of the video display with the object detection system displaying in a side view mode showing a representation of the vehicle, a height of the underside section of the vehicle above the ground and a representation of an object a first distance away from the vehicle as detected by the object detection system in accordance with the first embodiment.
Figure 5:
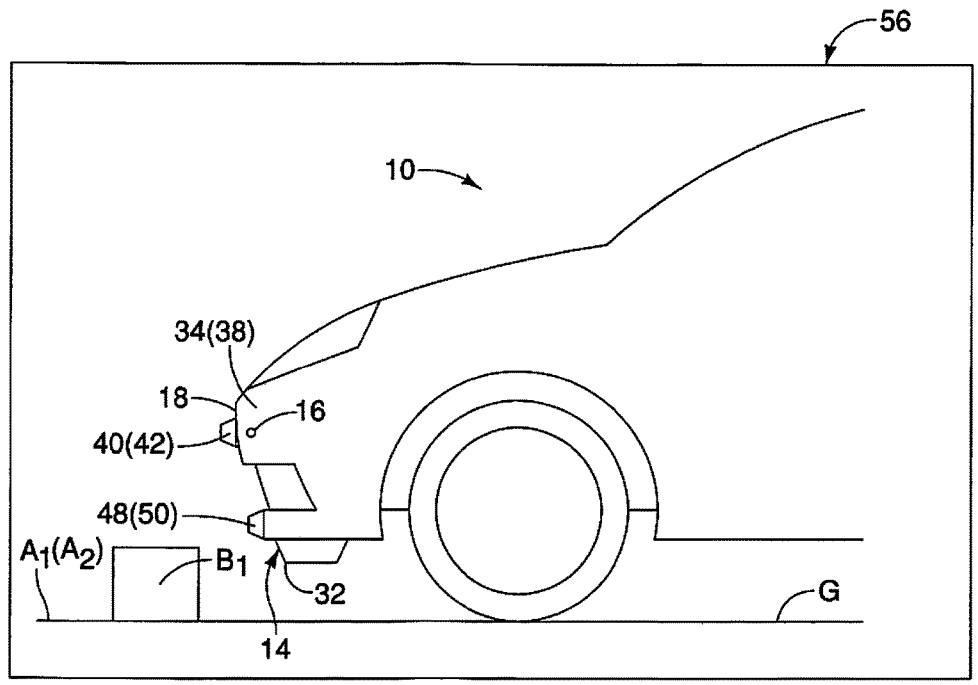
FIG. 5 is a second representation of the video display in the side view mode showing the representation of the vehicle and a representation of the object a second distance away from the vehicle as the vehicle approaches the object, the video display providing an indication of the height of the object as detected by the object detection system, the video display further showing the height of the underside surface relative to the height of the object in accordance with the first embodiment.
Figure 6:
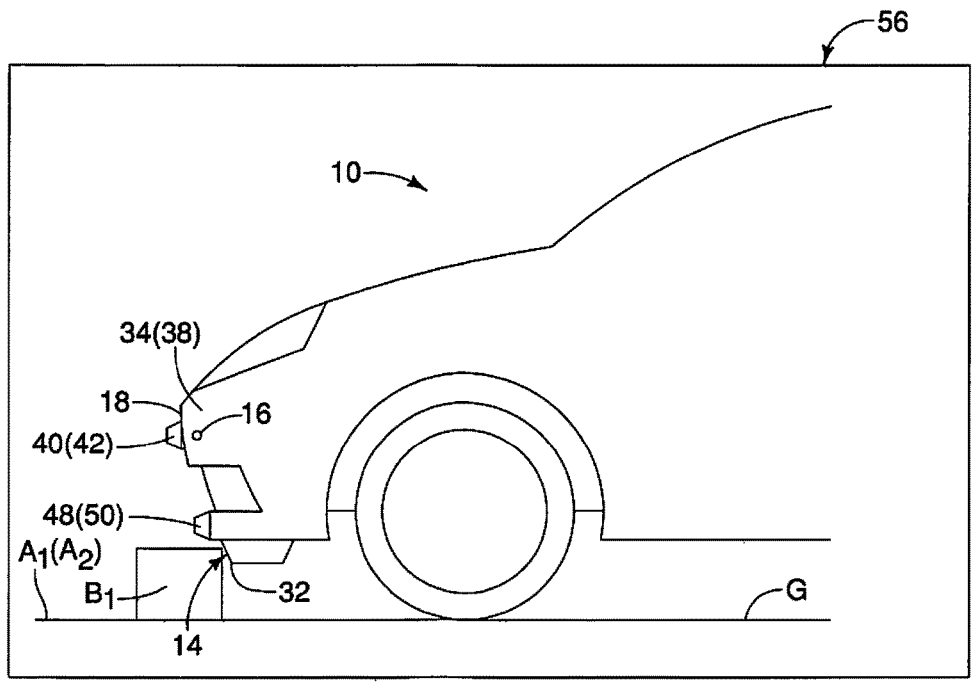
FIG. 6 is a third representation of the video display in the side view mode showing the representation of the vehicle and a representation of the object almost in contact with the vehicle as the vehicle approaches the object, the video display providing an indication of the height of the object as detected by the object detection system, the video display further showing the height of the underside surface relative to the height of the object in accordance with the first embodiment.
Figure 7:
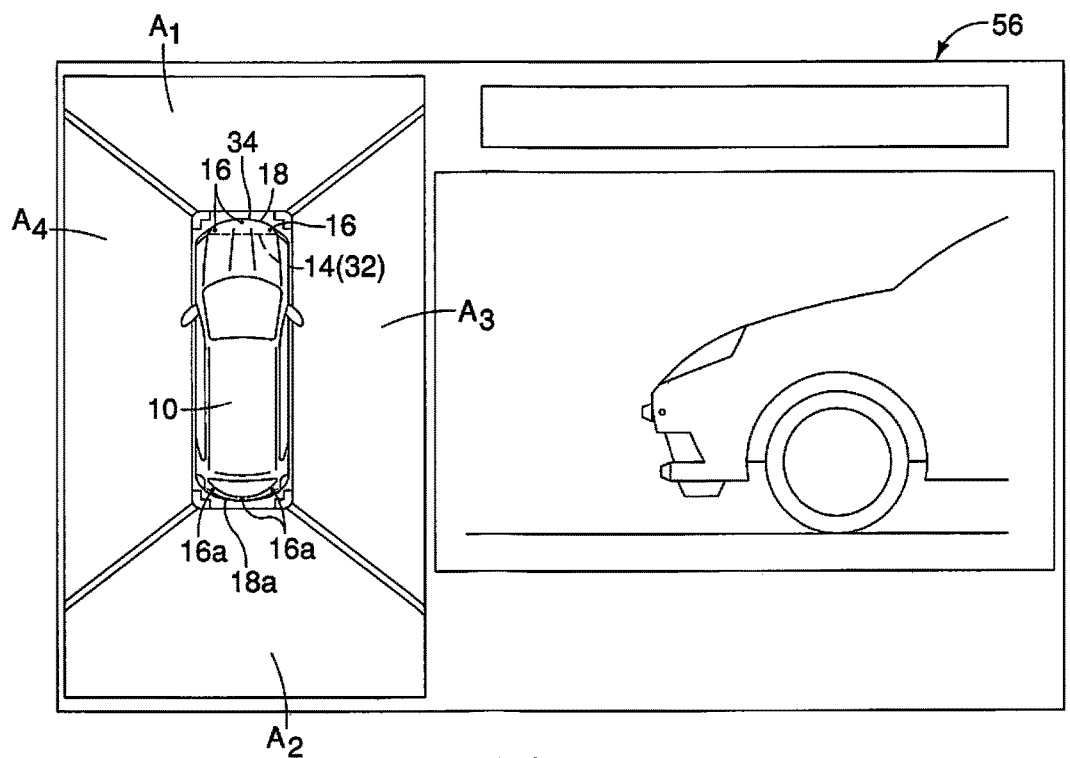
FIG. 7 is a further representation of the video display in an around view monitor mode (AVM mode) showing a representation of front, rear, driver's side and passenger side surfaces, with indications of the areas adjacent to the front, rear, driver's side and passenger side surfaces as viewed by the plurality of cameras mounted to the vehicle in accordance with the first embodiment.
Figure 13:
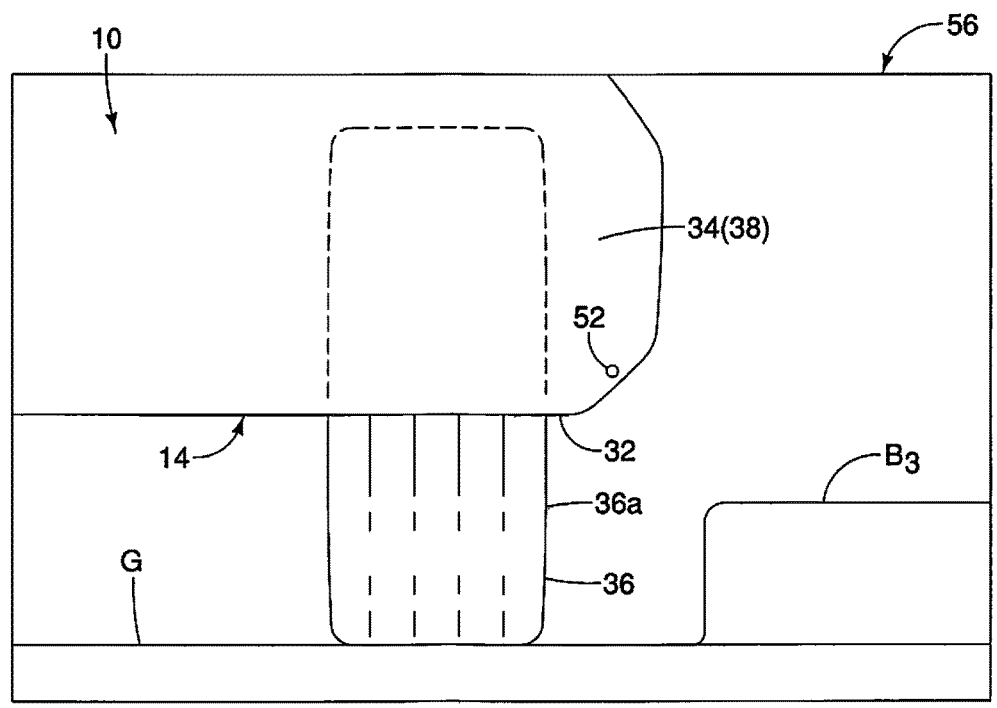
FIG. 13 is a representation of the video display with the object detection system displaying in a parallel parking view mode showing a representation of a curb or object detected at one lateral side of the vehicle and showing a representation of a wheel of the vehicle in accordance with the first embodiment.

The operation of the controller 62 and video display 56 in the side view mode is demonstrated in FIGS. 4-6. Specifically, FIG. 4 is a depiction of images shown on the video display 56 that are generated by the controller 62 based upon object information from the front camera 40 and/or object information from the front sensor 48. In the depicted embodiment of FIGS. 4-6, the object information relating to distance and height is captured by the front sensor 48. The video display 56 shows a computer generated representation of the front bumper facia 34 of the vehicle 10 with a representation of the height of the underside section 14 (the surface 32) above the ground G. The controller 62 includes dimensions of the lower surface 32 and of the front bumper fascia 34 stored in the memory 60 and/or preprogrammed into the software that determines the operations of the controller 62. The controller 62 causes the video display 56 to display a computer generated representation of an object $B_1$ detected at a first distance away from the lower surface 32 (the first example of the underside section 14) of the front bumper fascia 34. The height of the object $B_1$ determined by the sensor 48 is lower than the outermost surface 18 of the front bumper fascia 34 but is higher than the lower surface 32 of the front bumper fascia 34. Therefore, it is possible to move the vehicle 10 to a location where a portion of the front bumper fascia 34 can be brought above the object $B_1$. However, by observing the computer generated images shown in FIGS. 4-6, the vehicle operator can avoid having the object $B_1$ contact the lower surface 32 of the front bumper fascia 34. Further, the controller 62 can generate a rhomboidal or rectangular representation of the object $B_1$ using the detected closest point of the object $B_1$ and the detected height of the object $B_1$. This computer generated representation can then be displayed on the video display 56 in the simulated side view (FIGS. 4-6) or the simulated rear side view (FIG. 13).

As the vehicle 10 moves closer to the object $B_1$, the controller 62 updates the video display 56 based on the continuously provided object information from the front camera 40 and the front sensor 48, as shown in FIG. 5. Specifically, FIG. 5 is another representation of computer generated images produced by the controller 62 and displayed by the video display 56 showing the object $B_1$ at a second distance away from the lower surface 32 of the vehicle 10, closer than the first distance shown in FIG. 4. As the vehicle 10 continues to move closer to the object $B_1$, the controller 62 further updates the video display 56 based on the continuously provided object information from the front camera 40 and the front sensor 48, as shown in FIG. 6. FIG. 6 is yet another representation of the video display 56 showing the object $B_1$ a third distance away from the lower surface 32 of the vehicle 10, closer than the first and second distances shown in FIGS. 4 and 5. Since the sensor 48 has detected the height of the object $B_1$ and the distance of the object $B_1$ away from the lower surface 32 of the vehicle 10, the vehicle operator can make informed decisions regarding the movement of the vehicle 10 near and possibly above the object $B_1$.

The controller 62 is further configured to generate an audible alarm for the benefit of the vehicle operator in response to the controller 62 determining that the underside section 14 (the lower surface 32) is less than a predetermined distance away from the object $B_1$. For example, the predetermined distance can be one meter, fifty centimeters, twenty five centimeters or a manually entered amount set by the vehicle operator via the control panel 58.

Figure 8:
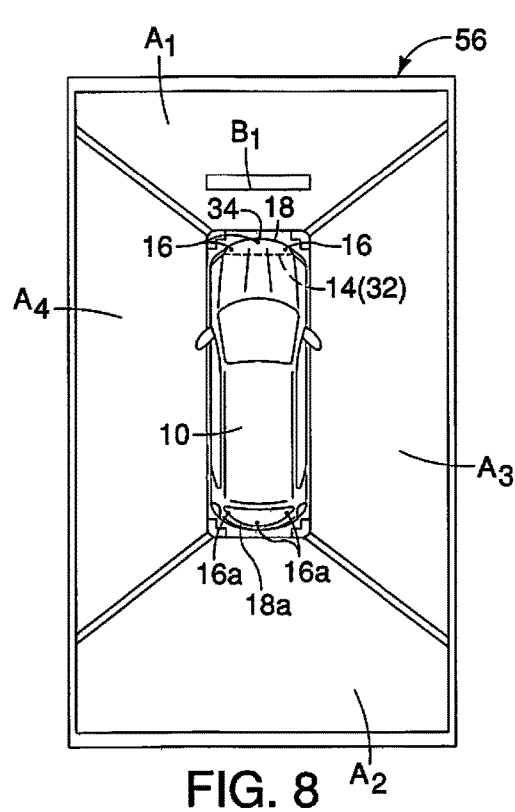
FIG. 8 is a representation of a portion of the video display with the object detection system displaying in the AVM mode showing an object in front of the vehicle as detected by the object detection system in accordance with the first embodiment.
Figure 9:
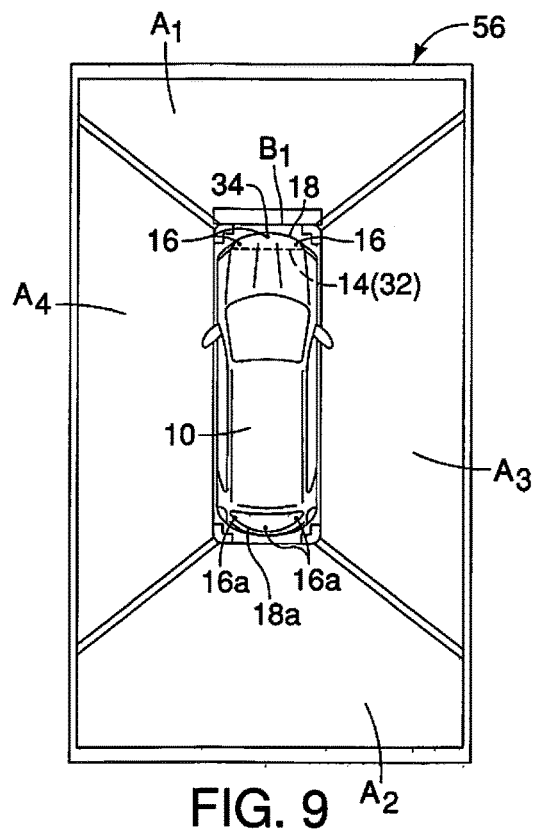
FIG. 9 is a representation of the portion of the video display similar to FIG. 8 with the object detection system displaying in the AVM mode showing the object in front of the vehicle as the vehicle approaches the object in accordance with the first embodiment.
Figure 10:
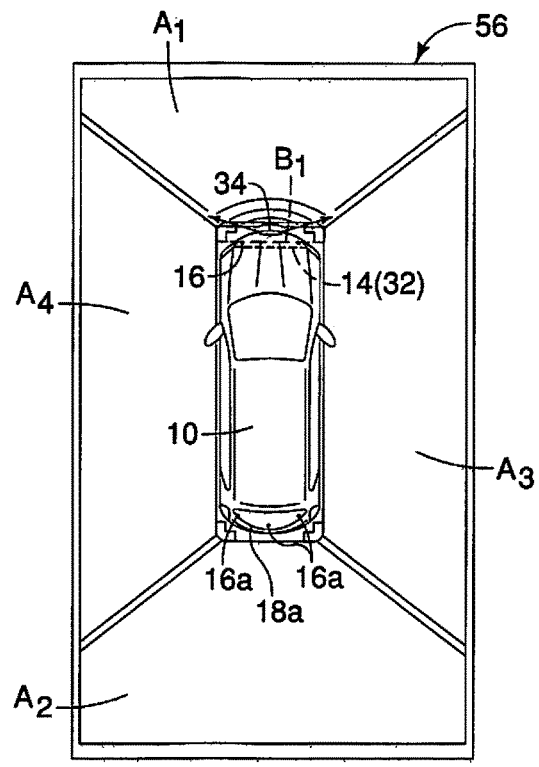
FIG. 10 is a representation of the portion of the video display similar to FIG. 9 but slightly enlarged, with the object detection system displaying in the AVM mode showing a computer generated representation of the object under the vehicle as the vehicle moves over the object in accordance with the first embodiment.

The operation of the controller 62 and video display 56 in the AVM mode is demonstrated in FIGS. 7-10. FIG. 7 is a depiction of the entire screen of the video display 56, with a left hand section showing the AVM mode view and a right hand section showing computer generated images also shown in FIG. 4 (side view mode). The vehicle operator can select one or both types of images, AVM mode view and/or side view mode. Alternatively, as indicated in FIG. 7, both the AVM mode and the side view mode can be utilized simultaneously. Thus, a vehicle operator can see on the display 56 an accurate depiction of the height of the lower surface 32 and the height of the object B1, as well as the AVM view showing overhead images of the areas surrounding the vehicle 10. FIGS. 8-10 only show the left hand section of the video display 56 since the side view mode has already been described with respect to FIGS. 4-6. However, it should be understood from the drawings and the description herein that the video display 56 can have any of a variety of shapes and configurations. Furthermore, the depictions in FIGS. 8-10 can alternatively represent the full depiction of the video display 56, if the vehicle operator selects the AVM mode only.

FIG. 8 is a depiction of the video display 56 just after the controller 62 has detected the object $B_1$. The images shown on the video display 56 are transmitted from the controller 62 and are taken from object information (video images) captured by the front camera 40 and supplemented by further object information from the front sensor 48. The video display 56 shows video images of the object $B_1$, along with a representation of the entire vehicle 10. Further, the video display 56 also shows the object $B_1$ detected at a first distance away from the lower surface 32 of the front bumper fascia 34 (the underside section 14) of the vehicle 10. In FIGS. 7-10, the controller 62 generates a dashed line that represents the lower surface 32 thus providing the vehicle operator with an indication in the AVM mode views of the underside section 14 to be protected from contact with a detected object.

As the vehicle 10 moves closer to the object $B_1$, the controller 62 updates the video display 56 based on the continuously provided object information from the front camera 40 and the front sensor 48, as shown in FIG. 9. Specifically, FIG. 9 is another representation of the video display 56 showing the object $B_1$ a second distance away from the lower surface 32 of the front bumper fascia 34 the vehicle 10, closer than the first distance shown in FIG. 8. As the vehicle 10 continues to move closer to the object $B_1$, the controller 62 further updates the video display 56 based on the continuously provided object information from the front camera 40 and the front sensor 48, as shown in FIG. 10. FIG. 10 is yet another representation of the video display 56 showing the object $B_1$ being at least partially beneath the vehicle 10 and approaching the lower surface 32 of the front bumper fascia 34. Consequently, in FIG. 10, the controller 62 has generated a faux representation of the object $B_1$ so that the vehicle operator has a sense of the location of the object $B_1$ relative to the lower surface 32 of the front bumper fascia 34 the vehicle 10. In the AVM mode, since the controller 62 has determined the height of the object $B_1$ relative to the height of the lower surface 32 of the front bumper fascia 34 (the underside section 14), the controller 62 can provide warnings in the form of text on the video display 56 and/or audible warnings indicating the proximity of the object $B_1$ relative to the lower surface 32 (the underside section 14) of the front bumper fascia 34 the vehicle 10. For example, the controller 62 can be programmed to provide a first audible warning signal when the object is a first distance away from the underside section 14 of the vehicle 10. As the vehicle 10 moves closer to the object $B_1$, the controller 62 can issue a second audible warning, different from the first warning. Further, when the object $B_1$ approaches the underside section 14, the controller 62 can issue a third audible warning different from the first and second audible warnings to provide the vehicle operator with adequate warnings of the proximity of the object $B_1$ to surfaces of the vehicle 10, including the surface that defines the underside section 34. Consequently, the vehicle operator can make an informed decision and can decide whether or not to continue movement toward the object $B_1$. The first, second and third audible warning signals are preferably different from any audible signals produced by the conventional proximity detection system that are produced as a result of taller objects detected by the proximity sensors 16 and approaching the outermost surfaces 18 and 18a.

It should be understood from the above description that the controller 62 monitors the output of each of the plurality of sensors and the plurality of cameras. Therefore, the above detection of the presence, height and relative location of the object $B_1$ and the images produced by the controller 62 on the video display 56 applies equally to objects detected in any of the areas $A_2$, $A_3$ and $A_4$ and their possible contact with a corresponding underside section 14 located at a corresponding one of the rear, passenger's side and/or driver's side of the vehicle 10.

The controller 62 can additionally provide warnings in the form of differing colorings of the object $B_1$ in the depictions of the object $B_1$ in both the side view mode (FIGS. 4-6) and in the AVM mode (FIG. 8-10). Specifically, as the vehicle 10 moves toward the object $B_1$, the controller 62 can define several critical distances. For example, when the object $B_1$ is first detected by the controller 62 within the prescribed area (i.e., area $A_1$), the object $B_1$ can be shown in a first color such as the color green. Once the object $B_1$ is less than a first critical distance from the underside section 14, but safely distanced from the vehicle 10, the controller 62 can display the object $B_1$ in a second color, such as yellow, as a warning to the vehicle operator that the vehicle is approaching the object $B_1$. Once the object $B_1$ is less that a second critical distance from the underside section 14 (but much closer than the first critical distance), the controller 62 can display the object $B_1$ in a third color, such as red, as a warning to the vehicle operator that the vehicle is approaching the object $B_1$. Further, if the controller 62 detects that the object $B_1$ has a height greater than the height of the underside section 14, once the object $B_1$ is within the second critical distance, the controller 62 can display the object $B_1$ in the third color (red) but further cause the third color to blink or flash on and off as a warning to the vehicle operator that the object $B_1$ will contact the underside section 14 if the vehicle 10 continues to move to a location where the vehicle 10 will at least partially cover the object $B_1$.

In other words, the controller 62 is configured to determine whether or not the height of the object $B_1$ is such that it can collide with any outboard surface of the vehicle 10 as well as any surface that defines the underside section 14 of the vehicle 10. Consequently, the controller 62 can provide a vehicle operator with a visual representation of the height of the detected object relative to the height of the underside section 14, such that the vehicle operator can safely decide whether or not to park the vehicle 10 with a portion of the vehicle 10 covering a detected object where the controller 62 has determined that the detected object has a height that is less than the height of the underside section 14 of the vehicle 10.

In FIGS. 4-6 and 8-10, the object $B_1$ had a geometrically simple shape, such as a rectangle. More specifically, the object $B_1$ was, for example, a concrete barrier in a parking lot commonly known as a parking stop. A vehicle parking in a parking space with a parking stop typically approaches the parking stop slowly until the wheels of the vehicle contact the parking stop. However, in vehicles with low underside sections, where the underside section 14 is lower than the height of the parking stop, the vehicle operator may bring the underside section 14 into unwanted contact with the parking stop. The object detection system 12 provides the vehicle operator with visual information that informs the vehicle operator as to whether or not the underside section 14 is likely to contact an object such as the parking stop.

Figure 11:
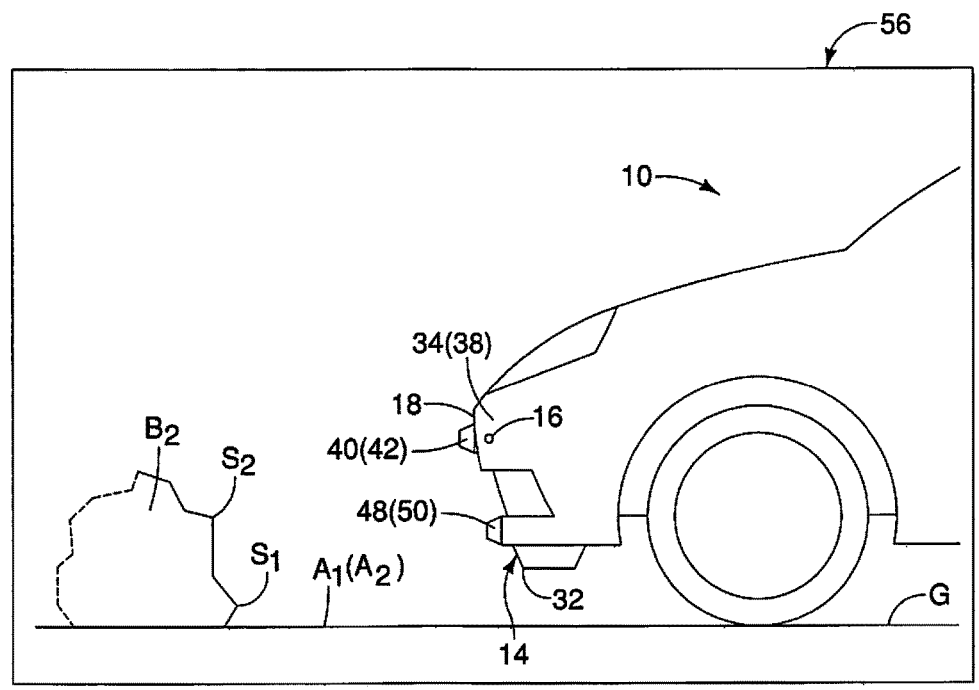
FIG. 11 is a representation of the portion of the video display similar to FIG. 4 with the object detection system displaying in the side view mode showing a second object in front of the vehicle as the vehicle moves closer to the second object in accordance with the first embodiment.

However, there are many differently shaped objects that can cause a vehicle operator concern when parking or maneuvering the vehicle 10 in a confined space. For example, in FIG. 11 an object $B_2$ has an irregular shape. In FIG. 11, the object $B_2$ represents an obstacle such as, for example, a boulder or a pile of plowed packed snow that may be of some concern to a vehicle operator. The object detection system 12 can determine the height and location of surfaces of interest of the object $B_2$ relative to the underside section 14 of the vehicle 10 and can additionally determine the height and location of multiple surfaces of the object $B_2$.

The object $B_2$ shown in FIG. 11 has multiple surfaces with multiple corresponding heights. The object detection system 12, using the object information from either or both the front camera 40 and the front sensor 48, detects both the heights of the surfaces $S_1$ and $S_2$ closest to the vehicle 10 and to the underside section 14 (for example, the lower surface 32 of the front bumper fascia 34). FIG. 11 is a depiction of operation of the controller 62 and the video display 56 operating in the side view mode showing at least the surface $S_1$ and the surface $S_2$ of the object $B_2$. Clearly the surface $S_1$ is lower than the height of the lower surface 32 of the front bumper fascia 34 (the underside section 14) and the surface $S_2$ is above the height of the lower surface 32 of the front bumper fascia 34 (the underside section 14). As the vehicle 10 approaches, the proximity sensors 16 will detect the presence of the surface $S_2$ and can issue an appropriate warning to the vehicle operator. However, the front camera 40 and the front sensor 48 detect the height and distance to the surface $S_1$ and can provide the vehicle operator with a separate warning and sufficient information for the vehicle operator to decide how close to move toward the object $B_2$. The above described visual (color) and audio warnings can also be generated by the controller 62 for of the surface $S_1$. Warnings for the surface $S_2$ are provided by the proximity detection system driven by the proximity sensors 16.

Figure 12:
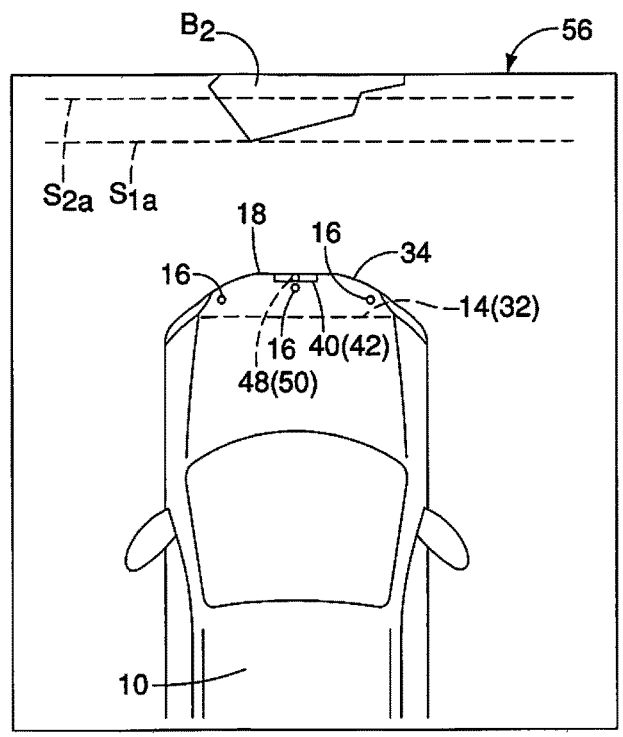
FIG. 12 is a representation of the portion of the video display similar to FIG. 9 with the object detection system displaying in the AVM mode showing the second object with a superimposed computer generated representation of a planar boundary corresponding to the location of the closest point of the second object as the vehicle approaches the object in accordance with the first embodiment.

The object $B_2$ is shown in FIG. 12 as displayed on the video display 56 with the controller 62 and the video display 56 operating in the AVM mode. The object $B_2$ is shown as an image captured by the front camera 40. Additionally, planar or linear representations of the surface $S_1$ and the surface $S_2$ of the object $B_2$ are superimposed on the video display 56 by the controller 62. Specifically, the controller 62 generates a tangent line $S_{1a}$ drawn tangent to the closest point of potential contact along surface $S_1$ to give a planar representation of the surface $S_1$, and generates a tangent line $S_{2a}$ tangent to the closest point of contact along surface $S_2$ to give a planar representation the surface $S_2$ of the object $B_2$. The line $S_{1a}$ and the line $S_{2a}$ are tangent lines displayed on the video display 56 relative to the images representing the vehicle 10.

By using both the side view mode and the AVM mode to display the captured object information, the vehicle operator can determine how close the vehicle 10 can be moved toward the object $B_2$ without the underside section 14 contacting the surface $S_1$ and the surface $S_2$ of the object $B_2$.

Figure 14:
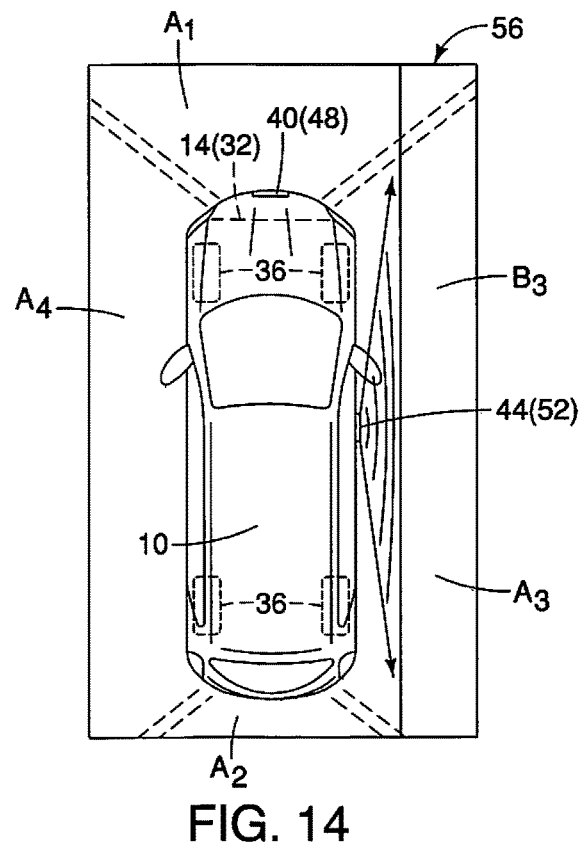
FIG. 14 is a representation of the video display with the object detection system displaying in the AVM mode showing the curb or the object detected at the one lateral side of the vehicle in accordance with the first embodiment.

FIGS. 13 and 14 represent a circumstance where the object detection system 12 detects an object in an area adjacent to one side of the vehicle 10. The description relating to FIGS. 13 and 14 is with respect to the area $A_3$ as monitored by the passenger's side camera 44 and the passenger's side sensor 52. However, the description applies equally to the area $A_4$ as monitored by the driver's side camera 46 and the driver's side sensor 54.

In FIG. 13, the controller 62 is operating in the parallel parking view mode and has generated images representing an object $B_3$. The object $B_3$ is, for example, a curb at the side of a city street and FIGS. 13 and 14 represent maneuvers relating to parallel parking. The surface of the object $B_3$ is lower than the height of the underside section 14, and specifically is lower than the height of the lower surface 32 of the front bumper fascia 34. However, the outboard side surface 36a of the wheel 36 extends down to the ground G, and is technically a portion of the underside section 14. Therefore, the vehicle operator can benefit from object information that reveals the proximity of the object $B_3$ relative to the underside section 14, which includes the lower surface 32 of the front bumper fascia 34 and the side surface of the wheel 36.

In FIG. 14, the object $B_3$ is displayed on the video display 56 with the controller 62 and the video display 56 operating in the AVM mode. The object $B_3$ is shown as an image captured by the passenger's side camera 42. The warnings described above with reference to the proximity of the objects $B_1$ and $B_2$ equally apply to the detection of an object, such as the object $B_3$ at one of the sides of the vehicle 10.

Figure 15:
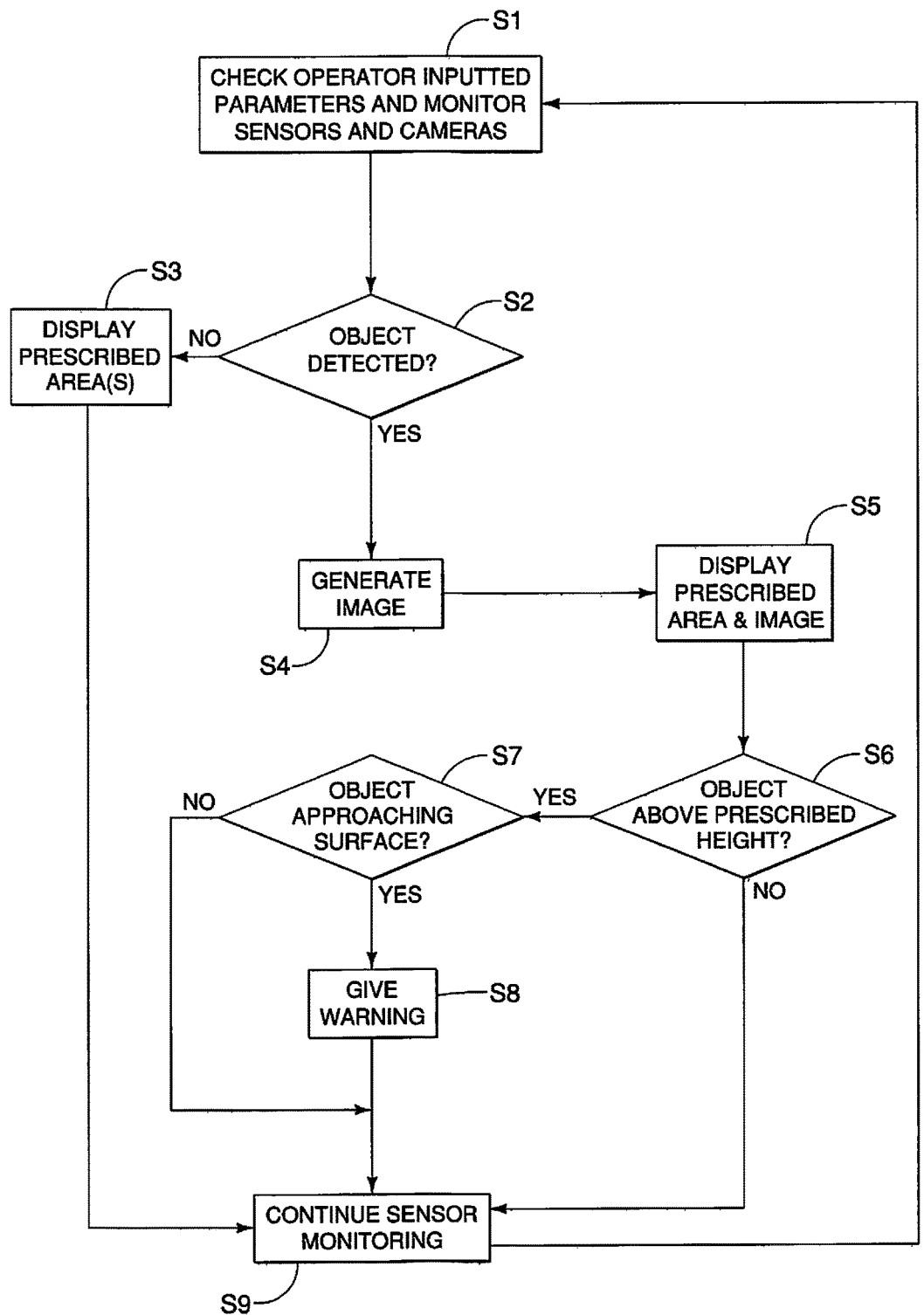
FIG. 15 is a flowchart representing basic operational steps of the object detection system in accordance with the first embodiment.

A description is now provided for the flowchart depicted in FIG. 15, which outlines the basic operation of the controller 62. At step S1, the controller 62 is engaged to monitor the object information and check operator-inputted parameters. The object information is provided by one or more of the plurality of cameras (the front camera 40, the rear camera 42, the passenger's side camera 44 and the driver's side camera 46) and one or more of the plurality of sensors (the front sensor 48, the rear sensor 50, the passenger's side sensor 52 and the driver's side sensor 54). The operator-inputted parameters are described below.

The controller 62 typically engages the object detection system 12 automatically when the vehicle operator operates the vehicle 10 in reverse or at slow speeds (e.g. under 10 mph). In other words, the controller 62 is configured to automatically detect when the vehicle 10 is being operated for delicate maneuvers, such as parking, or maneuvering in a confined space, such as a driveway or parking garage.

Alternatively, the vehicle operator can manually select for one or all of the plurality of cameras and a corresponding one or more of the plurality of sensors to be activated via input using the control panel 58. If the vehicle 10 is being operated to park the vehicle 10 moving in a forward direction, the vehicle operator can engage only the front camera 40 and only the front sensor 48 to monitor the area $A_1$ in front of the vehicle 10 to detect objects such as the object $B_1$. If the vehicle operator has selected the side view mode of operation, only images such as those shown in FIGS. 4-6 and 11 are generated by the controller 62 to provide object detection for the benefit of the vehicle operator. However, if the vehicle operator has selected the AVM mode of operation, the controller 62 generates a combination of video images and computer generated images such as those shown in FIGS. 7-10, 12 and 14 based on images captured by all of the plurality of cameras and object information detected by all of the plurality of sensors. If the vehicle operator has selected the parallel parking mode, only images similar to that represented in FIG. 13 are shown. Specifically, in the parallel parking view mode, one or both of the passenger's side of the vehicle (area $A_3$) and the driver's side of the vehicle 10 (area $A_4$) are monitored thereby generating images on the video display 56 similar to the view shown in FIG. 13. The vehicle operator can set a warning sensitivity. For example, the vehicle operator can input that audible and visual warnings begin being generated by the controller 62 at selected distances away from the vehicle 10. If no level of warning sensitivity has been selected or inputted by the vehicle operator, the controller 62 uses default warning sensitivity settings.

The video display 58 can also be manually or automatically engaged by the controller 62 to simultaneously show combinations of images corresponding to the side view mode, the AVM mode and/or the parallel parking mode.

However, the controller 62 is preferably configured to automatically operate in the AVM mode generating images such as those shown in FIGS. 7-10, 12 and 14, and automatically switch or simultaneously depict views in the side view mode (FIGS. 4-6 and 11) and/or parallel parking mode (FIG. 14) when an object is detected approaching any one of the four sides of the vehicle 10 (the front side and area $A_1$, the rear side and area $A_2$, the passenger's side and area $A_3$ and/or the driver's side and area $A_4$).

As mentioned above, at step S1, the controller 62 checks any parameters that may have been changed relative to factory settings. For example, if there has been a change in the vehicle body dimensions, the controller 62 detects these changes and alters the computer generated images sent to the video display 58 accordingly. If the vehicle 10 has been modified using, for example, an aftermarket body kit that protrudes from the original factory set vehicle body structure dimensions, the controller 62 can make appropriate adjustments to the depicted images and the object detection settings, such as the threshold for providing an audio or visual alarm indicating proximity of a detected object. One such aftermarket body kit can include a rear or front spoiler that lowers the height of the defined underside section 14, making detection of the height of approaching objects a greater concern. Hence, the controller 62 can determine whether or not the height of the underside section 14 has been re-set by a technician or the vehicle operator. Computer generated images of the underside section(s) 14 of the vehicle body structure 20 can then be modified based on the changed parameters.

At step S2, the controller 62 determines whether or not an object has been detected in area $A_1$, area $A_2$, area $A_3$ and/or area $A_4$ adjacent to the vehicle 10 and whether or not the detected object has a height that is greater than the height of the outermost surface 18 or 18a. If no object has been detected shorter than the outermost surface 16 or 16a, operation moves to step S3 where appropriate images are displayed on the video display 56. At step S2, if an object shorter than the outermost surface 16 or 16*a* has been detected, operation moves to step S4 where object information from the plurality of sensors and plurality of cameras is evaluated. It should be understood that any detected object with a height above the outermost surface 18 or 18*a* will be detected by the proximity detection system and appropriate warnings will be provided in response to object information detected by the proximity sensors 16 and/or 16*a*.

At step S4, the controller 62 evaluates the object data captured by the appropriate one of the plurality of cameras and the appropriate one of the plurality of sensors and generates appropriate images and representations of the detected object. The memory 60 includes a representation of a parking stop (object $B_1$) and a curb (object $B_3$). These representations can include a rectangular representation of the detected object as eventually viewed on the video display 56. The rectangular representations can be resized to have a height corresponding to the detected height of the detected object. The shapes and dimensions of the vehicle 10 stored in the memory 60 can also be re-set or re-dimensioned in response to modification to the physical dimensions of the vehicle 10. For example, if an aftermarket bumper fascia or spoiler has been added to the vehicle 10, the overall dimensions of the vehicle 10 can be changed. Further, the controller 62 can adjust the dimensions of the vehicle 10 in response to vehicle suspension changes. For example, if the vehicle 10 is provided with air pressure controlled suspension, distances between surfaces of the vehicle and the ground can change as a result of adjustments to the air suspension. The controller 62 can make appropriate adjustments to the dimensions of the vehicle stored in memory. The controller 62 can further include a data entry updating capability that enables modifications to the preset vehicle data stored in the memory 60. At step S4, the controller 62 can use the captured sensor data relating to the detected object, and use the information stored in the memory 60 in order to generate an image to represent the detected object. The generated image can be a straight line (for the side view) indicating a plane that coincides with the closed point or surface of the detected object relative to the underside section 14. Alternatively, in the AVM view, the image can be a video image captured from one of the plurality of cameras.

At step S5, the object information corresponding to the currently detected object is displayed on the video display 56, and operation proceeds to step S6. The information displayed depends upon which mode the controller 62 is operating in. In the AVM mode, images captured by the plurality of cameras are displayed on the video display 56 along with the planar representation(s) of surfaces of the identified object. In the side view mode and parallel parking view mode, computer generated images are generated by the controller 62. Operation then moves to step S6.

At step S6, the controller 62 evaluates the object information of the detected object and determines whether or not the height or heights of the surface or surfaces of the detected object are higher or lower than the height of the underside section 14. If the detected object has one or more surfaces that are above the prescribed height of the underside section 14, then operation moves to step S7. Further, if the controller 62 cannot determine the height of a detected object, then operation also moves to step S7 where the height of the detected object is assumed to be above the prescribed height of the underside section 14. If the detected object is shorter than the prescribed height of the underside section 14, then operation moves to step S9.

At step S7, the identified object has a surface or surfaces that are above the prescribed height of the adjacent underside section 14. If the controller 62 determines in step S7 that there is a possibility of contact between the detected object and the underside section 14, operation moves to step S8. If the controller 62 determines in step S9 that there is currently no possibility of contact between the detected object and the underside section 14, operation moves to step S9.

At step S8, a warning signal is generated by the controller 62. The warning signal can be a visual warning on the video display 56 showing the surface of the detected object approaching the underside section 14, and/or can be an audible signal, such as a repeated beeping flowed by a continuous noise when contact appears imminent.

At step S9, the controller 62 returns to step S1 for continuous object detection by the plurality of cameras and the plurality of sensors until vehicle conditions dis-engage the object detection system 12 by, for example, turning the engine off or resuming normal driving of the vehicle 10 at speeds above, for instance, 10 mph.

The object detection system 12 can be modified in any of a variety of ways. For example, in some vehicles only a part of the object detection system 12 may be installed. Specifically, in some vehicles the only object detection required can be at the rear of the vehicle 10. In such a vehicle, the front camera 40, the passenger's side camera 44, the driver's side camera 46, the front sensor 48, the passenger's side sensor 52 and the driver's side sensor 54 are all eliminated. Instead, only the rear camera 42 and the rear sensor 50 are included to detect objects in the area $A_2$, rearward of the vehicle 10 when the vehicle 10 is being backed up (in reverse).

Other modifications are also possible, as set forth in the second and third embodiments described below.

Second Embodiment

Figure 16:
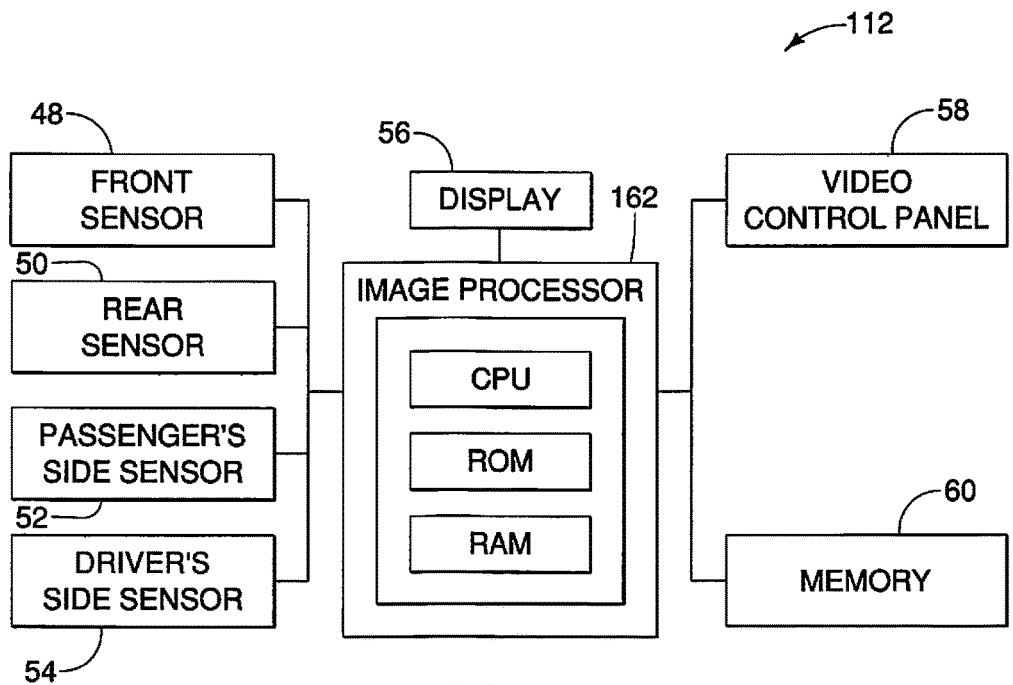
FIG. 16 is a block diagram of an object detection system of a vehicle, the object detection system including, among other elements, a plurality of sensors, a controller, a control panel and a video display in accordance with a second embodiment.

Referring now to FIG. 16, an object detection system 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the object detection system 112 includes many of the features described above with respect to the first embodiment, such as the front sensor 48, the rear sensor 50, the passenger's side sensor 52, the driver's side sensor 54, the video display 56, the control panel 58, the memory 60 and the controller 62. However, in the second embodiment, the plurality of cameras is eliminated.

In the second embodiment, the plurality of sensors (the front sensor 48, the rear sensor 50, the passenger's side sensor 52 and the driver's side sensor 54) captures all object information. The images generated by the controller 62 on the video display 56 are computer generated images generated by the controller 62.

Third Embodiment

Figure 17:
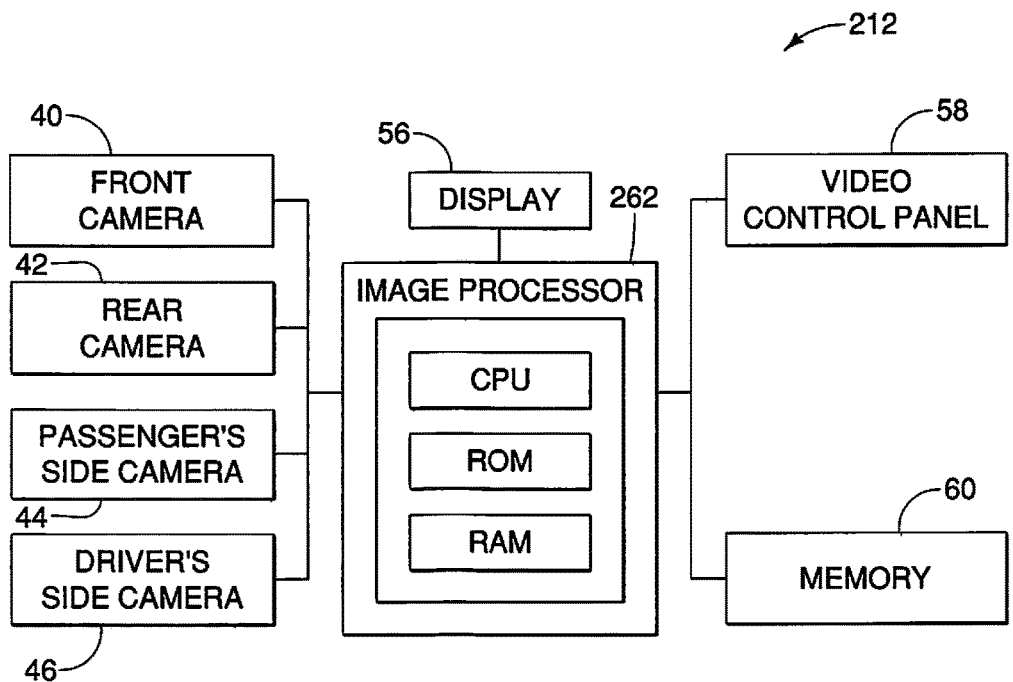
FIG. 17 is a block diagram of an object detection system of a vehicle, the object detection system including, among other elements, a plurality of the cameras, a controller, a control panel and a video display in accordance with a third embodiment.

Referring now to FIG. 17, an object detection system 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the object detection system 212 includes many of the features described above with respect to the first embodiment, such as the front camera 40, the rear camera 42, the passenger's side camera 44, the driver's side camera 46, the video display 56, the control panel 58, the memory 60 and the controller 62. However, in the second embodiment, the plurality of sensors is eliminated.

In the third embodiment, the plurality of cameras (the front camera 40, the rear camera 42, the passenger's side camera 44 and the driver's side camera 46) captures all object information. The front camera 40, the rear camera 42, the passenger's side camera 44 and the driver's side camera 46 can each include a stereo imaging capability such that each of the plurality of cameras has depth perception capability. Further, the controller 62 can be further configured to calculate the heights of surfaces on detected objects based upon images captured by the plurality of cameras, in combination with detection of vehicle speed. Using observed changes in geometric relationships between surfaces of detected objects, in combination with known distances traveled (based on speed), heights and distances can be determined by the controller 62.

The controller 62 preferably includes a microcomputer with an object detection program that processes images from the plurality of cameras and processes object information detected by the plurality of sensors. The controller 62 further generates images that are transmitted to the video display 56 and further controls the video display 56. The controller 62 can also include other conventional components such as an input interface circuit connected to the control panel 58, the cameras and the sensors, an output interface circuit connected to the video display 56 and an audio signal generator (not shown) for emitting audible warnings, and storage devices such as a ROM (Read Only Memory) device and a RAM (Random Access Memory) device, and the memory 60.

It will be apparent to those skilled in the art from this disclosure that the precise structure and algorithms for the controller 62 can be any combination of hardware and software that will carry out the functions of the present invention.

Various vehicle and vehicle body structure elements are conventional components that are well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the object detection system. Accordingly, these terms, as utilized to describe the present invention should be interpreted relative to a vehicle equipped with the object detection system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle object detection system comprising:
    a vehicle body structure defining a passenger compartment and having an underside section located at a predetermined height above ground below the vehicle body structure;
    a sensing device configured to detect an object within a prescribed area adjacent to the underside section of the vehicle body structure as the vehicle body structure approaches the object, the sensing device including at least one video camera;
    a video display viewable from within the passenger compartment configured to display images representing the prescribed area adjacent to the underside section of the vehicle body structure; and
    a controller configured to process object information received from the sensing device to determine the height of the object, and display images on the video display representing the object along with a representation of the height of the object relative to the underside section and images representing the underside section and the height of the underside section of the vehicle body structure, the controller is further configured to continually determine a location of the object in response to movement of the vehicle body structure, and in response to the controller determining that the object is outside of a viewable range of the video camera, the controller is further configured to display a faux image of the object on the video display based upon a determined location of the object.

2. The vehicle object detection system according to claim 1, wherein the sensing device includes a detection and ranging system, and the controller is configured to continually determine location of the object in response to movement of the vehicle body structure, and in response to the controller determining that the object is determined to be outside of a sensing area of the detection and ranging system, the controller is further configured to display a faux image of the object on the video display based upon a determined location of the object.

3. The vehicle object detection system according to claim 1, wherein the sensing device is a detection and ranging system, and the representation of the height of the object relative to the predetermined height of the underside section above the ground includes the controller generating a tangent line passing through a closest surface of the object relative to the vehicle and superimposing the tangent line onto the video display.

4. The vehicle object detection system according to claim 1, wherein the sensing device includes a detection and ranging system, and the representation of the height of the object relative to the predetermined height of the underside section above the ground includes faux images generated by the controller in response to data received from the detection and ranging system combined with video images from the at least one video camera.

5. The vehicle object detection system according to claim 4, wherein the representation of the height of the object relative to the predetermined height of the underside section above the ground includes the controller generating a tangent line passing through a closest surface of the object relative to the vehicle and superimposing the tangent line onto the video display.

6. The vehicle object detection system according to claim 1, wherein the representation of the height of the object relative to the predetermined height of the underside section above the ground includes the controller generating a tangent line passing through a closest surface of the object relative to the vehicle and superimposing the tangent line onto the video display.

7. The vehicle object detection system according to claim 1, wherein the controller is further configured to determine height of a plurality of surfaces of the object in response to the object having a plurality of detectable surfaces at differing heights, and the representation of the height of the object relative to the predetermined height of the underside section above the ground includes the controller generating a plurality of tangent lines, each tangent line representative of differing ones of the plurality of detectable surfaces of the object, and superimposing each of the tangent lines onto the video display.

8. The vehicle object detection system according to claim 1, wherein the representation of the height of the object relative to the predetermined height of the underside section above the ground includes the controller generating a rectangular representation of the object relative to the vehicle and superimposing the rectangular representation onto the video display.

9. A vehicle object detection system comprising:

a vehicle body structure defining a passenger compartment and having an underside section located at a predetermined height above ground below the vehicle body structure;

a sensing device configured to detect an object within a prescribed area adjacent to the underside section of the vehicle body structure as the vehicle body structure approaches the object;

a video display viewable from within the passenger compartment configured to display images representing the prescribed area adjacent to the underside section of the vehicle body structure; and a controller configured to process object information received from the sensing device to determine the height of the object, and display images on the video display representing the object along with a representation of the height of the object relative to the underside section and images representing the underside section and the height of the underside section of the vehicle body structure, the controller being provided with predetermined dimensions corresponding to physical dimensions of the vehicle body structure, and the images representing the underside section of the vehicle body structure are generated based upon the predetermined dimensions, and the controller is further configured to receive inputted modified dimensions such that in response to the modified dimensions being received, the predetermined dimensions are replaced with the modified dimensions and the images representing the underside section of the vehicle body structure are generated based upon the modified dimensions.

10. The vehicle object detection system according to claim 9, wherein the controller is configured to generate the modified dimensions in response to a portion of the vehicle body structure being re-positioned.

11. A vehicle object detection system comprising:

a vehicle body structure defining a passenger compartment and having an underside section located at a predetermined height above ground below the vehicle body structure, the underside section including an outermost outboard surface and a downward facing surface;

a sensing device configured to detect an object within a prescribed area adjacent to the underside section of the vehicle body structure as the vehicle body structure approaches the object;

a video display viewable from within the passenger compartment configured to display images representing the prescribed area adjacent to the underside section of the vehicle body structure; and a controller configured to process object information received from the sensing device to determine the height of the object, and display images on the video display representing the object along with a representation of the height of the object relative to the underside section and images representing the underside section and the height of the underside section of the vehicle body structure, the controller further being configured to issue a warning signal in response to determining that the underside section is within a predetermined distance from the object, the controller being configured to issue a first warning signal in response to determining that the outboard surface of the vehicle is approaching the object, and the controller being configured to issue a second warning signal different from the first warning signal in response to determining that the downward facing surface is approaching the object.

12. The vehicle object detection system according to claim 1, wherein the underside section is a surface of the vehicle body structure facing downward.

13. The vehicle object detection system according to claim 1, wherein the underside section is a lower surface of a bumper fascia panel.

14. The vehicle object detection system according to claim 1, wherein
the underside section is a surface of a vehicle tire.

* * * * *